(12) United States Patent
Kammann et al.

(10) Patent No.: US 9,310,242 B2
(45) Date of Patent: Apr. 12, 2016

(54) METHOD AND SYSTEM FOR DETERMINING THE LOAD OF A MOTOR VEHICLE, AND MOTOR VEHICLE

(75) Inventors: Stefan Kammann, Kelkheim (DE); Michael Borsche, Frankfurt (DE); Martin Griesser, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 290 days.

(21) Appl. No.: 13/985,333

(22) PCT Filed: Feb. 10, 2012

(86) PCT No.: PCT/EP2012/052355
§ 371 (c)(1),
(2), (4) Date: Sep. 6, 2013

(87) PCT Pub. No.: WO2012/110431
PCT Pub. Date: Aug. 23, 2012

(65) Prior Publication Data
US 2014/0008132 A1    Jan. 9, 2014

(30) Foreign Application Priority Data
Feb. 14, 2011    (DE) .......................... 10 2011 004 028

(51) Int. Cl.
*G01G 19/08* (2006.01)
*B60C 23/04* (2006.01)
*B60T 8/172* (2006.01)

(52) U.S. Cl.
CPC ............ *G01G 19/08* (2013.01); *B60C 23/0408* (2013.01); *B60T 8/1725* (2013.01); *B60T 2250/02* (2013.01)

(58) Field of Classification Search
CPC ... B60C 23/0408; B60C 23/04; B60T 8/1725; B60T 2250/02; G01G 19/08
USPC ............ 701/124, 37, 39, 33.1, 75; 177/1, 136
See application file for complete search history.

(56) References Cited

U.S. PATENT DOCUMENTS 8,630,767 B2 * 1/2014 Karlsson et al. ............. 701/33.1
2003/0144767 A1    7/2003 Brachert et al.
(Continued)

FOREIGN PATENT DOCUMENTS

| DE | 10160059 | A1 | 8/2002 |
| DE | 10235563 | A1 | 2/2004 |
| DE | 102005031157 | A1 | 4/2006 |
| DE | 102006033951 | A1 | 10/2007 |
| DE | 102007047399 | A1 | 4/2008 |

(Continued)

OTHER PUBLICATIONS

"Hinweise zur Beurteilung von Messungen, Messergebnissen and Messunsicherheiten" (ABW) ("Fehlerrechnung"), TU-Muenchen, Physikalisches Praktikum, Stand Mar. 27, 2009, Item 10—Korrelierte Messwerte English translation of item 10 Correlated Measuring Values.

*Primary Examiner* — Marthe Marc-Coleman
(74) *Attorney, Agent, or Firm* — Laurence A. Greenberg; Werner H. Stemer; Ralph E. Locher

(57) ABSTRACT

A method for determining the load of a motor vehicle includes the following steps: detecting at least one physical measured variable that depends on the load and generating a measured value that represents the detected measured variable; evaluating the generated measured values in order to determine the load by correlating the generated measured values or the load values determined therefrom with each other in order to produce a correction value from the correlation, with the aid of which an actual load value is determined for the load of the motor vehicle. There is also provided a system for detecting the load of a motor vehicle, and a motor vehicle.

13 Claims, 3 Drawing Sheets

(56) References Cited

U.S. PATENT DOCUMENTS

2007/0038357 A1* 2/2007 Leminoux et al. .............. 701/75
2009/0187527 A1* 7/2009 Mcaree et al. .................. 706/52
2010/0114437 A1 5/2010 Boss et al.
2011/0066322 A1 3/2011 Karlsson et al.

FOREIGN PATENT DOCUMENTS

| DE | 102007023069 A1 | 11/2008 |
| DE | 202009011330 U1 | 11/2009 |
| DE | 102007047399 B4 | 4/2010 |
| WO | 2009/071104 A1 | 6/2009 |

* cited by examiner

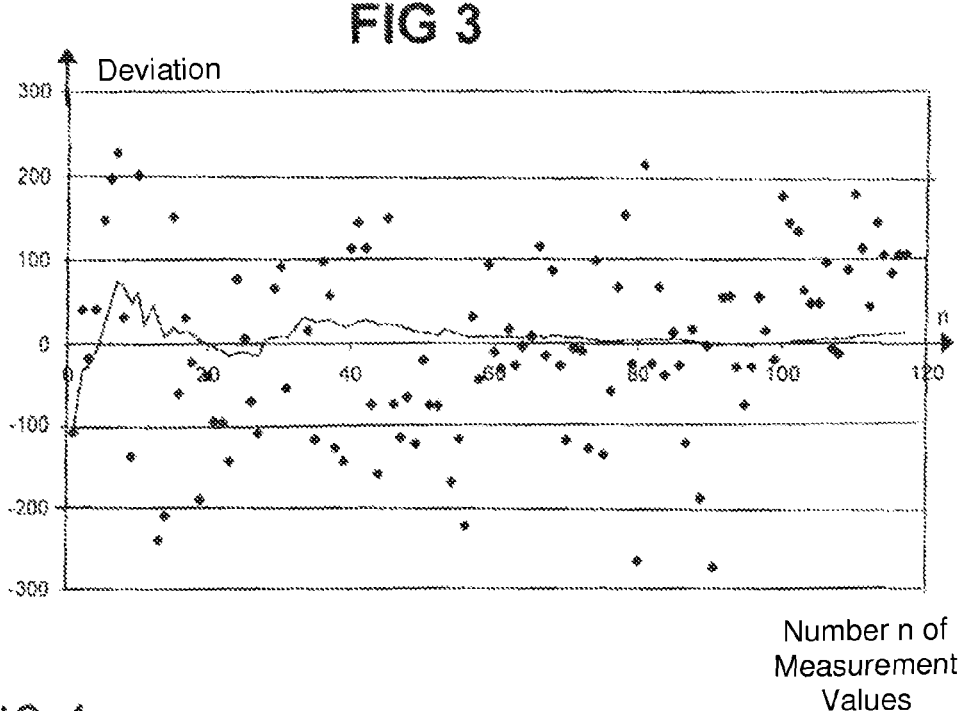
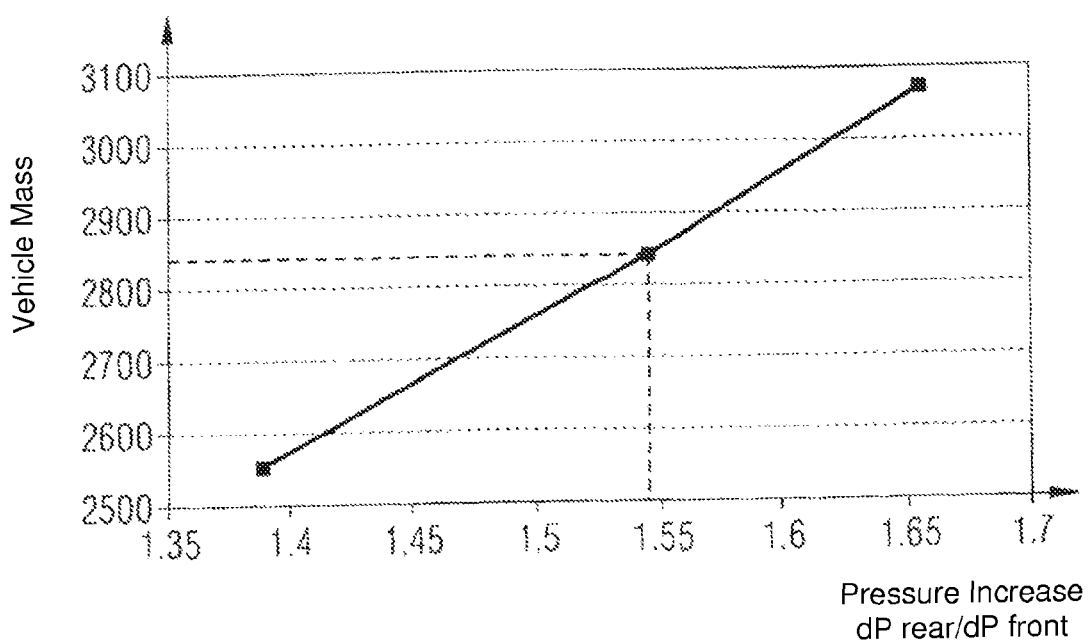

METHOD AND SYSTEM FOR DETERMINING THE LOAD OF A MOTOR VEHICLE, AND MOTOR VEHICLE

BACKGROUND OF THE INVENTION

Field of the Invention

The invention relates to a method and to a system for detecting the load of a motor vehicle. The invention also relates to a motor vehicle.

According to operational approval, any motor vehicle can only be loaded with a maximum load. The sum of the unladen weight plus the maximum payload of a motor vehicle is the permissible total mass or is also referred to in the German road traffic licensing regulations as the permissible total weight.

When the total weight is exceeded, the safety of the traffic can be endangered. As is generally road safety known, the payload can have a greater or lesser influence on the function and rolling property of the tires, the vehicle mass or the inertia of the vehicle. Consequently, the state of load has a large influence on the driving behavior of a vehicle, the handling of a vehicle and the driving safety, in particular if the payload is too large or is distributed unevenly in the motor vehicle.

In modern vehicles, systems are being increasingly used for improving the driving safety, such as, for example, an anti-lock brake system ABS, an electronic stability program ESP, a traction control system TCS, an electronic braking force distribution device EBD, an active chassis ABC, an active roll over protection ARP, a beam leveling system, a tire pressure monitoring system TPMS tire pressure monitoring system TPMS etc. These systems can be improved in terms of their control algorithms through knowledge of current load, which permits the safety of the motor vehicle to be increased further. For inadmissibly heavily laden vehicles, it is already possible that driving situations which cannot be overcome completely without difficulty in a load state which is still admissible can already be critical.

Devices for detecting loads in vehicles are known in many forms. Such methods are based on indirect measuring methods in which the load of the vehicle is derived on the basis of the engine torque, the driving resistance and also from the wheel load.

A disadvantage with such methods is that the engine torques and also the driving resistances can only be determined imprecisely since, for example, the wind or a positive gradient have a significant influence on the driving resistance. Likewise, measurement tire pressure values for determining the wheel load do not necessarily permit the correct load to be inferred. The results which are determined for the load are therefore heavily subject to error. Therefore, use in a passenger motor vehicle is not appropriate with such methods since in a passenger vehicle the proportion of the possible load compared to the weight of the vehicle is rather low. In contrast, in utility vehicles such an estimation of load can easily be used even though it is not precise enough either. If the load is low, the determination of the load is heavily subject to error.

In a method for detecting the load of a motor vehicle, described in DE 10 2007 023 069 A1, the load of the vehicle and/or a change in the load are/is detected on the basis of an analysis of the measured tire contact areas lengths (that is to say the tire contact areas) of the wheels. The tire contact area lengths are determined during braking and/or acceleration of the motor vehicle and/or during cornering.

In a system for detecting the load of a motor vehicle, described in DE 101 60 059 A1, a wheel contact force of the respective wheel substantially acting between the surface being driven on and the wheel contact surface is detected as the measured physical variable which is proportional to the vehicle mass. The state of load of the vehicle is then determined therefrom.

In these known methods, the load is detected on the basis of a measurement at, for example, each wheel position. Such measurements and the determination of the load which is determined therefrom are, however, very imprecise since external interference variables can falsify the result to a greater or lesser extent, and are therefore not suitable for all operating situations.

BRIEF SUMMARY OF THE INVENTION

An object of the invention is to provide a system for detecting the load of a motor vehicle which reliably determines the current load and, if appropriate, the load distribution.

This object is achieved by means of a method having the features as claimed, by means of a system having the features as claimed and by means of a motor vehicle having the features as claimed.

Accordingly, the following is provided:

A method for determining the load of a motor vehicle, having the steps: detecting at least one measured physical variable which is dependent on the load, and generating a measured value which represents this detected measured variable, evaluating the generated measured values in order to determine the load by correlating with one another the generated measured values or the load values determined therefrom, in order to generate from the correlation a correction value which is used to determine an actual load value for the load of the motor vehicle.

A system for determining the load of a motor vehicle, having at least one wheel-side and/or vehicle-side sensor device which is configured to detect at least one measured physical variable which is dependent on the load of the motor vehicle, and to generate a measured value which represents this detected measured variable, having an evaluation device which is configured to evaluate the generated measured values in order to determine the load by virtue of the fact that it correlates with one another the measured values for one or more sensor devices which are arranged on the wheel side and/or on the vehicle side or correlates with one another the load values determined therefrom in order to produce a correction value from the correlation, which correction value is used to determine a load value for the load of the motor vehicle.

A motor vehicle, in particular utility vehicle, having a multiplicity of wheels, having a device for holding a load, and having a system according to the invention which is configured to determine the load.

According to the invention, by means of at least one sensor device at least one measured physical variable which is dependent, inter alia, on the load is, in certain cases, detected multiply. A measured value which represents the measured variable is generated therefrom and is evaluated in a central evaluation device in order to determine the result for the current load therefrom. The measured variables can be detected on the wheel side at all the wheel positions or else on the vehicle side. The results of at least two measured variables are correlated with one another in order to determine, as appropriate, the correct load of the motor vehicle therefrom.

Advantageous refinements and developments of the present invention can be found in the further dependent claims and in the description with reference to the figures of the drawing.

It is advantageous if the sensor devices detect on the vehicle side measured variables, such as the tire pressure, driving resistance and/or engine torque, which are dependent on the vehicle mass.

The tire contact area length and/or the tire pressure values in each wheel can also be detected and in each case results for the load can be determined from the associated measured values, wherein two or more results are then correlated with one another.

A predefined minimum number of measured values which are dependent on the load or on the vehicle mass can also be detected, wherein the measured values are determined on the basis of application of statistical methods such as the formation of mean values or a median method for determining the load.

Measured values can also be divided up into value groups in accordance with their corresponding quantitative level of the measured value, and can be correlated within a group with other measured values of the same group in order to determine the load therefrom.

The tire pressure can be measured repeatedly on the wheel side for each wheel position and the change in the tire pressure over time can be detected. The result, which is determined from the measured values, can be correlated with the results which are obtained from the vehicle-side measured values.

It is advantageous to detect on the wheel side the measured variables, dependent on the vehicle mass, of the tires or the tire pressure in each case for the different wheel positions and to correlate the measured values produced therefrom with, in each case, measured values which originate from wheels of one axle or from wheels which are arranged diagonally. The measured values assigned to a single wheel may also be correlated with the measured values which originate from the other wheels.

The above refinements and developments can, where appropriate, be combined with one another as desired. Further possible refinements, developments and implementations of the invention also comprise combinations, not explicitly mentioned, of features of the invention which are described with respect to the exemplary embodiments above or below. In particular, in this context a person skilled in the art will also add individual aspects as improvements or supplements to the respective basic form of the present invention.

The present invention will be explained in more detail below with reference to the exemplary embodiments which are specified in the schematic figures of the drawing, in which:

BRIEF DESCRIPTION OF THE SEVERAL VIEWS OF THE DRAWING

FIG. 3 shows a measurement curve for a multiplicity of measured values of a measurement variable which is measured on the vehicle side, and FIG. 4 is a diagram showing the relationship of the ratio of pressure increase values in the tires of wheels arranged per axle to the vehicle mass.

DESCRIPTION OF THE INVENTION

Figure 1:
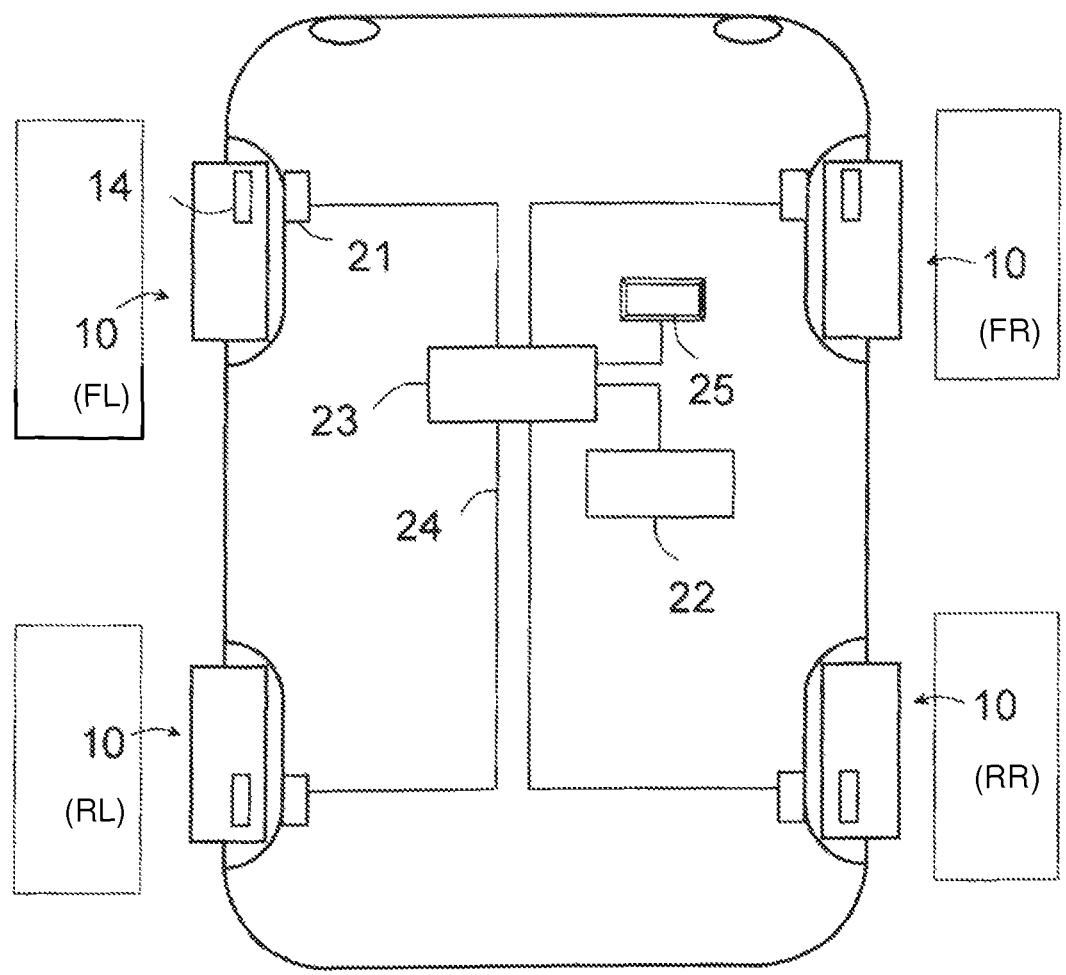
FIG. 1 shows a block circuit diagram of a system according to the invention for detecting the load of a motor vehicle.

The appended drawings are intended to provide further understanding of the embodiments of the invention. They illustrate embodiments and serve, in conjunction with the description, to explain principles and concepts of the invention. Other embodiments and many of the specified advantages are apparent from the drawings. The elements of the drawings are not necessarily shown true to scale.

In the figures of the drawing, identical, functionally identical and identically acting elements, features and components are each provided with the same reference symbols, unless stated otherwise.

In the text which follows, the invention will be explained in more detail with reference to the use in a motor vehicle as an exemplary embodiment. The system for detecting the load of a motor vehicle can, of course, be used not only in a motor vehicle but also in a motor cycle, a truck or some other utility vehicle. Likewise, it is possible also to use the system in an aircraft.

Figure 2:
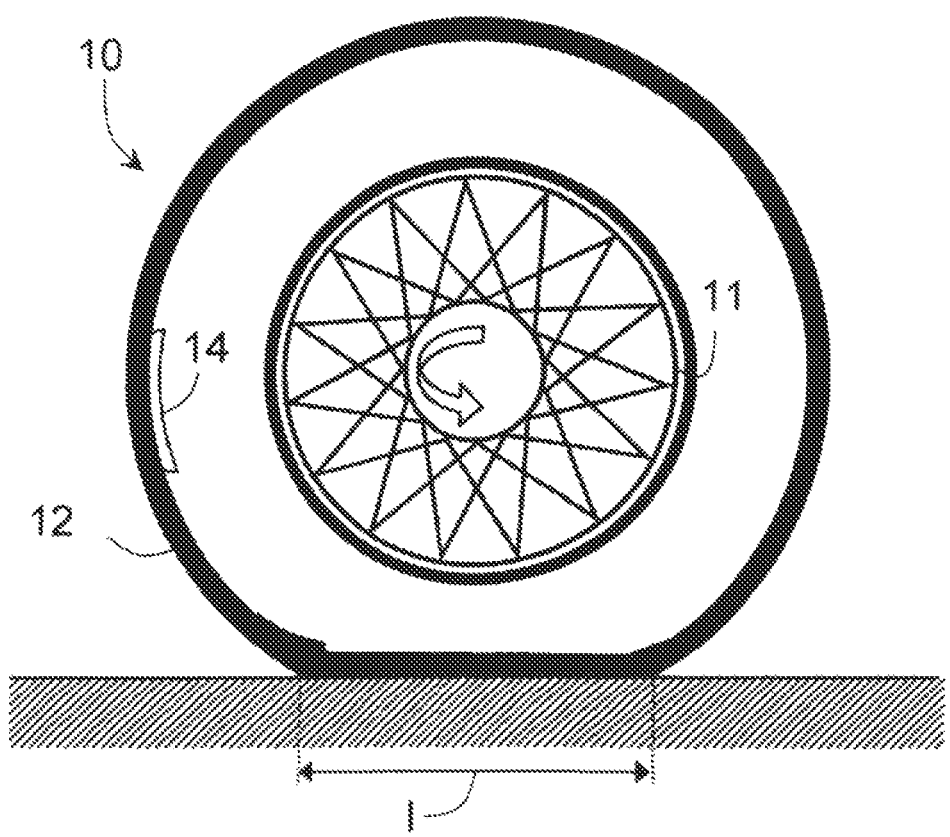
FIG. 2 shows a view of a vehicle wheel in which a sensor device which measures a measured physical variable which is dependent on the vehicle masses is arranged.

FIG. 1 shows a schematic block diagram of a system with which physical measured variables can be measured on the wheel side, such as the tire pressure of each motor vehicle tire 12, the tire contact area of each tire 12, or on the vehicle side, such as the driving resistance or the engine torque etc. These measured physical variables are dependent, inter alia, on the vehicle mass. Therefore, the load and, if appropriate, the load distribution can be determined from these measured variables. A vehicle wheel 10 usually has a rim 11 (see FIG. 2) with a tire 12 which is fitted thereon. In the text which follows, mention is made only generally of a wheel 10 (unless expressly the tire 12 or the rim 11 or some other part of the wheel 10 is meant).

The system according to the invention for detecting the load has vehicle-side sensor devices 21 which are arranged in the vicinity of each wheel 10 in each case, for example on the suspension strut. Wheel-specific or tire-specific physical measured variables, such as the rotational speed of a wheel 10 or the load of the vehicle damping system, are measured for each wheel 10, i.e. for each wheel position, using the sensor devices 21. The measured values are passed on here to a further-processing device (here an evaluation device 23) and evaluated there by means of mathematical models. Finally, the actual load is calculated therefrom as a final result.

The measured values and the result are also available to every other control device in the motor vehicle if the measured values are "put" onto a data bus or data/signal lines 24. Conversely, measured values which are determined by other control devices 22 in the motor vehicle, such as, for example, the currently present engine torque which is available in the engine control device 22, can be communicated to the evaluation device 23 since the engine control device 22 is also connected to the data bus.

Measured physical variables which depend, inter alia, on the vehicle mass (such as the tire pressure, tire contact area, tire contact force) can also be measured on the wheel side for each wheel 10 or each tire 12, i.e. for each wheel position FL, FR, RL, RR. For this purpose, one or more sensor devices 14 are arranged in the wheels 10, which sensor devices 14 have sensor elements such as a tire pressure sensor, an acceleration sensor and/or deformation sensor.

In each wheel 10 (front left FL, front right FR, rear left RL and rear right RR) which rotates during travel, there may be such a wheel-side sensor device 14 in any case, for example for a tire pressure monitoring system used in the motor vehicle.

The wheel-side sensor devices 14 can have transmitting and receiving units as well as electronic units (not illustrated), including a power supply in each wheel 10 in each case. The sensor devices 14 measure the various physical variables (measured variables) of the wheel 10 directly, these being, for example, the tire pressure, tire contact length 1, acceleration and/or wheel load, and they transmit the measured values in a signal to the vehicle-side evaluation device 23 for evaluation.

In the case of situations which are critical for driving (excessively high load or load located too much on one side), it is possible, if appropriate, to control a corresponding vehicle-specific function (either directly by means of the evaluation device 23 or by means of some other control device such as the engine control device 22 or an ABS control device), not illustrated, specifically as a function of the load of the motor vehicle, respectively determined from the measured values. In addition, a visual display unit or acoustic indicator unit 25 can be activated for the driver if an operationally relevant or safety-relevant situation is detected, for example if an excessively high load is detected or the tire pressure is too low for the current load.

For example, the tire contact length 1 of each tire 12 can be measured, i.e. at each wheel position FL, FR, RL, RR, as a physical measured variable. The tire contact length 1 changes here as a function of the vehicle mass and therefore as a function of the respective wheel load and therefore of the load or load distribution (how the load is distributed positionally in the motor vehicle). If the tire contact length 1 of the various wheels 10 together with the tire pressures there are compared with one another, a load distribution can also be determined. The tire contact length 1 is, moreover, dependent on the properties/parameters of the tire 12 itself. The tire parameters can be communicated here to the evaluation device 23 in the event of a tire change so that these parameters can be taken into account in the determination of the load.

In the same way, the tire pressure can be measured for each wheel position FL, FR, RL, RR. The tire pressure is also dependent on the load. The distribution of the load can also be determined by comparing the various tire pressures at the various wheel positions FL, FR, RL, RR. Since the tire pressure is also dependent on the vehicle speed (owing to the rotational speed of the wheels 10), the pressure increase dP as the speed increases can also be determined. The speed can be measured on the wheel side or else also on the vehicle side. The tire pressure can be measured by means of rotational speed sensors, expansion sensors, acceleration sensors or pressure sensors. The load of the motor vehicle can be determined from the measured values for the tire pressure.

In a similar way, mechanical loads of the chassis suspension can also be measured on the vehicle side for each wheel position FL, FR, RL, RR. For this purpose, the load of the suspension can be measured separately. The measured values can also be present in any case in a control device (for example engine control device 22 or some other control device). The load of the motor vehicle can also be determined from the corresponding measured values.

In conventional systems, the vehicle mass is determined from the measured values, if appropriate added, for the tire pressure or the tire contact length 1 as a result, and the load can be determined given a known unladen weight (unladen mass). However, interference variables, such as the ambient air pressure, the velocity, the surface of the roadway, the age of the tires and/or the profile depth, also have disadvantageous effects. If the wheel loads are added together, the errors also add up since, for example in the case of travel at a high altitude, the ambient air pressure acts equally on all four tires 12 and, for example, the tire contact length 1 is shorter at all four tires 10. However, the load does not have to have changed even if the tire contact area length 1 changes.

According to the invention, the load values which are determined from a plurality of measured values in some cases are correlated with one another. That is to say first a result (also referred to as an individual result) for the determined load is, if appropriate, corrected with a second (individual) result or a plurality of other (individual) results for the load if the results differ from one another by more than a tolerance limit.

In this way, the wheel loads, the tire contact area length 1 or tire pressure values of the wheels 10 can be detected as measured values on the wheel side an the load can be determined therefrom individually or by adding all the values.

In order to be able to improve the precision, one or two measured values or the result thereof (corresponding to the calculated load) can also be correlated with two other measured values or the respective results thereof for the determination of the load. A ratio is advantageously formed between the measured values of the two wheels 10 of one axle and those measured values of the wheels of another axle, in order to obtain the resulting load therefrom or to correct the calculation of the individual measured values. Likewise, the two measured values of diagonally arranged wheels 10 or of two measured values of wheels on one longitudinal side of the vehicle can be correlated with the corresponding two other measured values.

Given an axle load distribution of, for example, 60% at the front and 40% at the rear, a motor vehicle is partially laden and given an axle load distribution 40% at the front and 60% at the rear the motor vehicle is fully laden (if the trunk is arranged at the rear). If the unladen weight is known, the total load of the motor vehicle can be determined from these ratio values relatively precisely and can be determined cleaned of external interference variables.

However, a ratio can also be formed between the wheel loads of individual wheels 10 and those of all the other wheels 10. Likewise, a ratio can be formed between the wheel loads of wheels 10 on one side and the wheel loads of wheels 10 on the other side or the wheel loads of wheels 10 which are arranged crosswise/diagonally. The load of the motor vehicle can then be determined precisely therefrom and determined cleaned of interference variables.

It is advantageous if reference is always made to the wheel FL because a driver is always seated there (in the case of right-hand traffic) and therefore this wheel is influenced least by the vehicle load.

By following ratios between the wheel loads (relative method of load detection), not only can the absolute load be determined but also the load distribution. It is therefore possible to detect, for example, whether the seats are occupied by persons or a corresponding load is being transported in the trunk.

The driving resistance denotes the sum of resistances which a motor vehicle must overcome using a propulsion force in order to drive at a constant or accelerated v velocity on a horizontal or inclined plane. The driving resistance is the sum of the air resistance, rolling resistance, resistance due to gradient and acceleration resistance. The question about the drive power which is necessary to reach a specific speed is closely linked to the driving resistance. A certain driving torque is therefore required to reach the v velocity.

It is possible to detect the load from an analysis of the engine torques. In this context, the drive torque is compared with the driving resistance. However, the measurement of the driving resistance is subject to considerable tolerances (for example due to uphill travel or downhill travel or in the case of a strong opposing wind or side wind). The engine torques can be estimated only imprecisely. For this reason, the determination of the load is subject to greater or lesser degrees of error.

According to the invention, a minimum number of measurements, for example more than 20 measurements, are performed for the "engine torque" measured physical variable. From the measured values which are acquired therefrom it is then respectively possible to determine the engine torque, for example by means of statistical methods such as the formation of mean values or the median method. Alternatively, the engine torque is determined directly as a measured variable. In addition, loads which are subject to tolerance are calculated and are then considered statistically. Finally, the load of the motor vehicle can be calculated from the engine torque.

The median denotes here a boundary between two halves, as illustrated in FIG. 3. In statistics, the median halves a distribution (according to FIG. 3 the median is located on the zero line). Compared to the arithmetic mean, also referred to as the average, the median has the advantage of being robust with respect to outliers (extremely different values).

In FIG. 3, differences between the engine torques and calculated engine torques are plotted against the number n of measurements. By the formation of mean values and given a sufficient number of individual measurements (the number should be above a minimum number of, for example, 20 measurements), a sufficiently precise value is obtained for the engine torque. Given a known unladen weight, the load can therefore be determined easily from the engine torque.

The statistically evaluated measured values from the torque analysis are correlated with mean values or median values from the additive or relative load detection using the tire contact area length 1 measured on the wheel side, the tire pressure values or the measured wheel loads, as described above. As a result, the load can be determined even more precisely. The advantage of the detection of the load by correlation with the torque analysis is that this method functions largely independently of aging influences. Other external interference variables, such as the surface of the roadway, the type and dimension of the tires 12 etc. also hardly falsify the final result. It is therefore possible to correct by correlation using load values (results) determined using the measured variables measured on the wheel side, using the load value obtained from the torque analysis.

Alternatively, the detected measured values (tire pressure, tire contact length 1, engine torque) can be divided into groups of variables corresponding to the magnitude of the respective values. The measured values within one group of variables in each case can then be subjected to a statistical correction method, for example the formation of mean values, in order to determine the load therefrom more precisely. For example, the measured values for the tire contact area length 1 can be detected, and the load can be determined by adding or forming ratios between the tire contact area length 1 at the other wheel positions FL, FR, RL, RR.

For example, the determined load values can be divided into groups, for example the load values into the groups 0-200 kg, 201-400 kg, 401 to 600 kg etc. The determined values within the groups can then be averaged and correlated with the associated mean values of the torque analysis. In this way, not only is a comparison value or also calibration value/correction value obtained but rather a plurality of calibration values at the same time. As a result, not only can an offset in the load detection be corrected but also a change over time (increase) can be corrected by correlation. The offset denotes a linear shift in the upward or downward directions (for example from the zero value). The calibration value describes as it were the gradient of the measured values with respect to one another (for example the ratios of the pressure difference dP at the front/rear relative to the load values from the torque analysis). During the calibration, the measured values are corrected using the deviation from the corrected value. In the event of calibration, the values which are calculated from measurements are corrected in order, as a result, to become more precise than the initial values. The "precise" values are firstly not known but can also be determined relatively precisely by means of statistical considerations.

The load can also be determined using the analysis of the time profile of the tire pressure values. The tire pressure values can be measured here on the wheel side at each wheel 10 (direct measurement of the tire pressure) or else indirectly on the vehicle side by means of, for example, rotational speed sensors on the suspension strut. The tire pressure values of each wheel 10 are measured and evaluated in any case in modern vehicles.

In a first approximation, the pressure increase in a tire 12 is dependent linearly on the tire load and the vehicle speed v if the vehicle is in a steady state (dP/v~F; where dP=pressure difference between two points in times, v=average speed and F=wheel load). In the driving mode the measured values for the pressure increase dP/v measured variable (pressure increase standardized to the speed) of all the wheels 10 can be determined (total pressure increase). To do this, a plurality of tire pressure values of all the wheels 10 are necessary and a plurality of speed values within one time interval are necessary (if the speed v changes). The standardized pressure increase values are evaluated in the evaluation device 23 and divided into at least two groups, sorted according to their absolute value. In parallel with this, the corresponding load values can be determined from the torque analysis, and the associated load values are likewise determined and grouped according to their absolute value. Within the groups, statistical methods such as the mean value or median can then be formed, i.e. the load values can be correlated with one another in order to obtain the most precise possible value for the load.

Subsequently, the measured values from the pressure analysis and the torque analysis from the individual group can be correlated with one another. The values can be compared with one another longitudinally or transversely and corrected correspondingly. This means that the measured values of the individual wheels of any type can be compared with one another (for example diagonally (front/rear or according to the sides etc.). In this way, the measured values for the load can be determined using the pressure analysis and corrected on the basis of the torque analysis if a sufficiently large number of measured values are present. The vehicle mass and therefore the load can then be determined with sufficient precision from the pressure increase values.

Additionally or alternatively, instead of considering the total pressure increase over all the wheels 10, it is also possible to form a ratio between the tire pressure values (pressure increase values) on the basis of tires 10 which are arranged on an axle (the front axle and rear axle respectively). As a result of this correlation and the correlation with the result of the torque analysis, the load can also be determined with sufficient precision, and the individual values therefore corrected.

If these two variants are combined with one another, specific load states and driving states can be detected and a load or load distribution under difficult conditions can also be determined. This is because when the ratio is formed between pressure increase values on the basis of wheels which are arranged on an axle it is possible to determine incorrect values when traveling uphill or downhill. If the method of the total pressure increase were used in this case (that is to say dP/v were determined for all the wheels 10), the determination of the wheel load when traveling uphill or downhill would be more precise.

Conversely, the determination method with the total pressure of all the wheels 10 can also be incorrect in the case of changing environmental conditions, which can be corrected by the relative method of values which are considered on an axle basis.

FIG. 4 is a diagram showing the relationship of the ratio of pressure increase values in the tires of wheels 10 which are arranged on an axle basis with respect to the vehicle wheel in kg. If a ratio is formed between the pressure increases dP of the wheels 10 of the front axle "dP front" and the pressure increases dP of the wheels 10 of the rear axle ("dP rear"), these ratio values correspond to a corresponding vehicle mass. If, for example, the ratio of the pressure difference or of the pressure increase of the tire pressures of the front axle with respect to the tire pressures of the rear axle is approximately 1.545, the vehicle mass of approximately 2840 kg is assigned to this ratio given standard ambient conditions (see dot-dash lines in FIG. 4).

In order to determine the load, it is therefore firstly necessary for the ratios for the pressure increases dP to be determined. The associated vehicle mass is then determined from this, and the load is determined therefrom. In order to be able to calculate external interference variables from this, the result for the determined load can then also be correlated with the result from the engine torque analysis. The vehicle mass would then have to be increased or decreased slightly corresponding to a correction value if both results do not correlate. The correction value can additionally depend on a driving situation, the velocity, the duration of the previous journey and/or external temperature. In order to calculate the correction value it is also possible to perform plausibility checks to determine whether, given the currently prevailing conditions, one result or the other is more plausible or probable than the other.

By measuring the tire pressure values and associated times and/or vehicle speeds and by correlating the tire pressure values or pressure increase values it is therefore possible to determine the load given a known unladen weight of the motor vehicle. The load values which are determined are therefore more precise the more often the measured values are correlated with other measured values (such as, for example, from the torque analysis). That is to say the measured values can therefore be corrected in order to determine the exact loads depending on the situation and ambient conditions.

The determination of the load can be performed by means of wheel-side measured values (tire pressure or wheel contact area length 1). In this case, all the measured values of all the wheel positions FL, FR, RL, RR can be evaluated after being added (additive method), or a ratio can be formed (relative method) between a plurality of measured values (for example of all the wheels 10 of one axle with respect to the wheels 10 of another axle).

In the case of the tire pressure, a pressure difference can also be measured within a time interval (pressure increase method) in order to determine the load. In this context, a ratio can also be formed between all the measured values of all the wheel positions FL, FR, RL, RR (additive method) and evaluated together, or a ratio can be formed between a plurality of measured values (relative method).

Likewise, the load can be determined by means of the evaluation of vehicle-side measured values, such as the engine torques or driving torques (torque analysis) or of chassis suspension measured values (of the air springs at the respective wheel positions FL, FR, RL, RR).

According to the invention, the individual results of the determination of the load of one method are then correlated with the results of at least one other calculation method in order to obtain the most precise possible value for the load under a wide variety of conditions. Depending on which calculation method or measuring method is more precise, this method has more influence on the final result.

The torque analysis can therefore be used for long-term corrections, wherein the results from the other methods are correlated with the results from the torque analysis in order to obtain the most precise possible value for the load.

The results from the relative method can also be correlated with the results from the additive method in order to obtain the most plausible and precise possible result for the load. Although under normal driving conditions the additive method already provides results which are perfectly usable, this is not sufficient also to be able to obtain sufficiently precise results under all conditions and in all driving situations such as, for example, in the case of a rough roadway surface or in the case of low external air pressure. This is because in the additive method the errors from the individual values are also added. Therefore, these values can then be correlated with the results from the relative method and thereby corrected. For example, the mean value can be determined from both results as an end result or total result for the load.

The results from the tire contact area-based measurements (relative and additive method) advantageously complement one another through correlation with the results from the torque analysis.

The determination of the pressure increase is preferably used in the first time after the start of the vehicle. This is because in this time the tire contact area length 1 or the tire pressure is in any case measured more frequently than while the vehicle is traveling. Typically, the load can change only in the stationary state of the motor vehicle. A change in the load should therefore be detected shortly after the start. Later, while the vehicle is traveling there is usually no longer any change in load, the result being that in these phases the load has to be determined less often or not at all. However, while the vehicle is traveling the wheel load and therefore the tire pressure or the tire contact area length 1 can change, for example as a result of uphill and downhill travel, as a result of pot holes or due to changed ambient pressure, which would lead to a false result for the load. As a result of the correlation and as a result of the adaptation of the individual results using the correction value, measuring errors can be reduced. It is therefore possible, for example, to reject an individual result since it is implausible and to replace it with the other individual result.

The monitoring of the tire pressure and therefore also the measurement of the pressure increase can take place continually while the vehicle is traveling, with the result that significant changes in the load can also be detected at any time and interference variables calculated therefrom.

The individual methods for determining the load can also be correlated with one another similarly to a neural network. In this context, all the sensor devices 14, 21 for detecting a measured variable, which is dependent, inter alia, on the load, are linked to one another by means of the evaluation device 23 in the manner of a neural network. Therefore, an exchange of information takes place, i.e. the results from one method or any desired combination of two or more methods can be correlated with one another in order to determine the load as precisely as possible and under all possible conditions. External interference variables are then not included, or included only to a very small degree, in the result of the determination of the load.

The advantage of detection of the load is that the driving safety is increased. This is because a changed load requires an adapted air pressure and adapted control information for its control devices such as, for example, the engine control device 22 or ABS control devices. Furthermore, the information that the tire pressure should be adapted given the current load can be displayed to the driver. This is because during journeys with an excessively low tire pressure, tire damage may occur, and at least increased energy requirement/energy consumption or else unequal wear of the tires can occur.

Although the present invention has been described above completely on the basis of preferred exemplary embodiments, it is not restricted thereto but rather can be modified in a variety of ways.

Wherever mention is made of wheel-side or tire-side devices, a location on the wheel 10 is meant, irrespective of where precisely the object is arranged (inside or outside the tire 12, on the rim 11 etc.). The objects outside the tire 10 but also in the motor vehicle are referred to as vehicle side (for example objects on the wheel arch in the vicinity of the wheels 10 or on the suspension strut).

The term "correlation" is to be understood as forming a relationship between two or more measured values, wherein, if appropriate, statistical methods are used here in order to evaluate the individual measured values or entire measuring series. As a result of the correlation, the measured values or the values obtained by means of statistical methods are corrected by measured values or results (the load which is determined by means of one or more methods). As a result, more precise values are acquired for the desired load which is to be determined, wherein the final result is obtained using a correction value. By means of plausibility checking or probabilities it is possible to decide which of the correlated individual results is to be given more weight. Measured information from the vehicle, for example from other control devices, can also contribute to this decisively.

LIST OF REFERENCE SYMBOLS

10 Wheel
11 Rim
12 Tire
14 Sensor device
21 Vehicle-side sensor device
22 Control device
23 Evaluation device
24 Data/signal lines
25 Display unit
dP Pressure difference
dP/v Pressure increase
F Wheel load
HL Wheel position rear left
HR Wheel position rear right
n Number of measurements
v Velocity
VL Wheel position front left
VR Wheel position front right

The invention claimed is:

1. A method of determining a load of a motor vehicle, the method which comprises:
    detecting at least one given physical measured variable which is dependent on the load of the motor vehicle, the physical measured variable representing a parameter selected from the group of parameters consisting of a pressure of a wheel, a ratio of pressures of two or more wheels, a wheel contact area length of one or more wheels, an engine torque, a driving resistance and a driving torque of the motor vehicle, and generating a measured value that represents the at least one measured physical variable;
    evaluating generated measured values in order to determine the load and thereby correlating with one another measured values or load values determined therefrom that represent at least two different parameters from the group of parameters, in order to generate from the correlation a correction value and using the correction value to determine an actual load value representing the load of the motor vehicle.

2. The method according to claim 1, wherein the detecting step comprises detecting physical variables that are dependent on a vehicle mass.

3. The method according to claim 2, wherein the physical variables are selected from the group consisting of a tire pressure, a contact area of the tires, a running resistance, and an engine torque.

4. The method according to claim 1, wherein the detecting step comprises detecting one or both of a tire contact length or a tire pressure with their measured values for each wheel of the vehicle as physical measured variables, and, in order to determine the correction value, correlating at least one measured value, which is determined for each wheel position, with at least one other measured value which is determined for another wheel position.

5. The method according to claim 1, which comprises:
    detecting a predefined minimum number of measured variables that are dependent on the load; and
    generating measured values representing the measured variables, and determining the actual load value for the load of the vehicle based on applying statistical methods to the measured values.

6. The method according to claim 5, wherein the statistical methods are a formation of mean values or a median method.

7. The method according to claim 5, which comprises using a formation of mean values as a statistical method, wherein the measured values are divided into groups of variables, and the measured value within one group of variables in each case are subjected to the formation of mean values in order to determine therefrom the actual load value for the load of the motor vehicle.

8. The method according to claim 1, which comprises measuring the tire pressure one or more times as a measured variable on the wheel side for each wheel position or detecting changes in the tire pressure over time, and correlating the determined measured values with one another or with measured values for the engine torque that are measured with chronological associations.

9. The method according to claim 1, which comprises:
    detecting as the measured variable dependent on the vehicle mass, a tire contact area length of the tires or the tire pressure in each case for different wheel positions; and
    correlating measured values generated therefrom in each case with measured values that originate from wheels of an axle or wheels that are arranged diagonally.

10. The method according to claim 1, which comprise correlating wheel-side measured values that are measured at the wheel with vehicle-side measured values that are measured at the vehicle and are each dependent on the vehicle mass.

11. A system for determining a load of a motor vehicle, the system comprising:
    at least one sensor device disposed as a wheel-side sensor device and/or as a vehicle-side sensor device and configured to detect at least one physical measured variable that is dependent on the load of the motor vehicle from two or more classes of physical parameters of the vehicle, and configured to generate a measured value that represents the detected physical measured variable;

an evaluation device disposed to receive measured values and configured to evaluate the generated measured value in order to determine the load by correlating with one another the measured values of one or more of said sensor devices or by correlating with one another the load values determined from the measured values of the two or more classes of physical parameters in order to produce a correction value from the correlation, and using the correction value to determine a load value representing the load of the motor vehicle.

12. A motor vehicle, comprising:

a plurality of wheels;

an arrangement for receiving and holding a load;

at least one sensor device disposed as a wheel-side sensor device and/or as a vehicle-side sensor device and configured to detect at least one physical measured variable that is dependent on the load of the motor vehicle from two or more classes of physical parameters of the vehicle, and configured to generate a measured value that represents the detected physical measured variable;

an evaluation device disposed to receive measured values and configured to evaluate the generated measured value in order to determine the load by correlating with one another the measured values of one or more of said sensor devices or by correlating with one another the load values determined from the measured values of the two or more classes of physical parameters in order to produce a correction value from the correlation, and using the correction value to determine a load value representing the load of the motor vehicle.

13. The motor vehicle according to claim 12, wherein the vehicle is a utility vehicle.

* * * * *